(12) United States Patent
Crawford et al.

(10) Patent No.: US 8,940,344 B2
(45) Date of Patent: Jan. 27, 2015

(54) CAPSULE CLUSTERS FOR ORAL CONSUMPTION

(75) Inventors: Danielle R. Crawford, Chester, VA (US); Shalva Gedevanishvili, Richmond, VA (US); William R. Sweeney, Richmond, VA (US); Chris Irving, Chesterfield, VA (US)

(73) Assignee: Philip Morris USA Inc., Richmond, VA (US)

( * ) Notice: Subject to any disclaimer, the term of this patent is extended or adjusted under 35 U.S.C. 154(b) by 928 days.

(21) Appl. No.: 12/155,634

(22) Filed: Jun. 6, 2008

(65) Prior Publication Data

US 2008/0305216 A1 Dec. 11, 2008

Related U.S. Application Data

(60) Provisional application No. 60/929,028, filed on Jun. 8, 2007.

(51) Int. Cl.
*A24C 1/18* (2006.01)
*A23L 1/00* (2006.01)
*A23L 1/0522* (2006.01)
*A23L 1/053* (2006.01)
*A23L 1/0532* (2006.01)
*A23L 1/22* (2006.01)
*A23L 1/302* (2006.01)

(52) U.S. Cl.
CPC ............ *A23L 1/0073* (2013.01); *A23L 1/0029* (2013.01); *A23L 1/0522* (2013.01); *A23L 1/053* (2013.01); *A23L 1/0532* (2013.01); *A23L 1/22016* (2013.01); *A23L 1/302* (2013.01)

USPC ............. 426/89; 131/119; 131/347; 131/352; 426/103; 426/96; 426/102; 426/650; 424/464; 424/751; 424/488

(58) Field of Classification Search
None
See application file for complete search history.

(56) References Cited

U.S. PATENT DOCUMENTS

| 3,757,798 A | 9/1973 | Lambert |
| 5,167,244 A | 12/1992 | Kjerstad |
| 5,332,595 A | 7/1994 | Gaonkar |
| 5,897,897 A | 4/1999 | Porzio et al. |
| 6,162,516 A | 12/2000 | Derr |
| 2003/0026874 A1 | 2/2003 | Porzio et al. |

(Continued)

FOREIGN PATENT DOCUMENTS

| EP | 1120044 A1 | 8/2001 |
| WO | WO98/18610 A1 | 5/1998 |

(Continued)

OTHER PUBLICATIONS

U.S. Appl. No. 11/984,041 as filed.

(Continued)

*Primary Examiner* — Richard Crispino
*Assistant Examiner* — Phu Nguyen
(74) *Attorney, Agent, or Firm* — Buchanan Ingersoll & Rooney PC

(57) ABSTRACT

Provided are oral products that provide engaging and flavorful experiences to a user. The oral product includes a plurality of capsules, a powdered component, a viscous component and a binder that create a matrix that is molded into a shape. In a preferred embodiment, the capsules provide functional and flavorful ingredients. In an embodiment, the matrix is enclosed in a porous material that forms a pouch.

13 Claims, 1 Drawing Sheet

(56) References Cited

U.S. PATENT DOCUMENTS

| | | |
|---|---|---|
| 2003/0224090 A1 | 12/2003 | Pearce et al. |
| 2004/0247649 A1 | 12/2004 | Pearce et al. |
| 2004/0247744 A1 | 12/2004 | Pearce et al. |
| 2004/0247746 A1 | 12/2004 | Pearce et al. |
| 2005/0003048 A1 | 1/2005 | Pearce et al. |
| 2005/0061339 A1 | 3/2005 | Hansson et al. |
| 2005/0067726 A1 | 3/2005 | Yan et al. |
| 2005/0095338 A1 | 5/2005 | Fernandes et al. |
| 2005/0100640 A1 | 5/2005 | Pearce |
| 2005/0244521 A1 | 11/2005 | Strickland et al. |
| 2006/0073190 A1 | 4/2006 | Carroll et al. |
| 2006/0191548 A1 | 8/2006 | Strickland et al. |

FOREIGN PATENT DOCUMENTS

| | | |
|---|---|---|
| WO | WO01/35925 A1 | 5/2001 |
| WO | WO02/00033 A1 | 1/2002 |
| WO | WO 2006/004480 | 1/2006 |
| WO | WO2006/082536 A1 | 8/2006 |
| WO | WO2007/057789 A2 | 5/2007 |
| WO | WO2007/057791 A2 | 5/2007 |

OTHER PUBLICATIONS

International Search Report and Written Opinion mailed Dec. 2, 2009 for PCT/IB2008/002568.

CAPSULE CLUSTERS FOR ORAL CONSUMPTION

CROSS REFERENCE TO RELATED APPLICATION

This application claims priority under 35 U.S.C. §119(e) to U.S. provisional Application No. 60/929,028, filed on Jun. 8, 2007, the entire content of which is incorporated herein by reference.

SUMMARY

Provided is an oral product for providing an engaging and flavorful oral experience to a user.

In one embodiment, the oral product includes a plurality of functional and/or flavor capsules and a binder that are mixed to form a matrix. In a preferred embodiment, the matrix is molded into a shape chosen from the group consisting of a pouch-shape, crescent, half-moon, rhombus, trapezoid, ellipsis, rectangle, heart, square, oval, sphere, and the like.

Preferably, the flavors and juices from the matrix are able to exit the pouch via pores in the pouch material. Preferably, each component of the matrix provides a different flavor, function, and/or texture. In other embodiments, each component of the matrix provides the same flavor, function and/or texture.

Preferably, the functional and/or flavor capsules are activated by mastication, sucking, or pH change. In an embodiment, the mastication, sucking action, or pH change preferably releases flavors or textural ingredients, such as an effervescent. In another embodiment, a vitamin or antioxidant is released. In another embodiment, the functional flavor capsules may provide a soothing ingredient, an energizing ingredient, a calming ingredient or an alerting ingredient.

In a preferred embodiment, the matrix includes a powdered component. In another embodiment, the matrix includes a viscous component.

In an embodiment, the oral product includes a porous material that forms a pouch. Preferably, the pouch contains capsules and/or a binder. In an embodiment, the contents of the pouch may completely or partially fill the interior of the pouch. In a preferred embodiment, a powdered component or a viscous component may also be enclosed in the pouch. In an embodiment, the capsules can contain non-viscous liquid components.

In a preferred embodiment, the porous material is dissolvable. Alternatively, the porous materials may be disintegrable. In an embodiment, the porous material may not be dissolvable or disintegrable, but may be removed from the mouth after the enclosed matrix has been consumed.

In another preferred embodiment, the porous material is a fabric or paper, such as those used in the production of tea bags or other oral pouches. In other embodiments, dissolvable or disintegrable polymers may also be used to form the pouch.

In another embodiment, the oral product includes a porous material that forms a coating around the matrix. Preferably, the coating is a super-hydrated membrane coating that provides additional moisture and good mouth feel to the user.

Also provided is a method for forming an oral product. In a preferred embodiment, the method includes mixing a binder and a plurality of capsules to form a matrix. The method also includes molding the matrix to create an oral product that is sized and configured to fit comfortably in a user's mouth.

In a preferred embodiment, the matrix is placed into a pouch and sealed therein to create a pouched oral product. In another embodiment, a plurality of capsules are inserted into a pouch to form an oral pouched product. In yet another embodiment, the molded matrix is coated with a super-hydrated membrane coating.

DETAILED DESCRIPTION

As described herein, an oral product, in the form of a capsule cluster, provides an engaging, flavorful, aromatic, energizing, and/or soothing experience by delivering ingredients to a user in a consumable unit. In a preferred embodiment, the ingredients form a matrix that is molded into an oral product. In another embodiment, the matrix is enclosed in a porous pouch designed to be inserted in the mouth. In yet another embodiment, a plurality of capsules are contained in a pouch product. In another embodiment, the matrix is coated by a super-hydrated membrane coating. Preferably, each ingredient of the capsules, pouch, and/or coating provides a different texture or flavor to enhance the oral enjoyment of the product.

Figure 1:
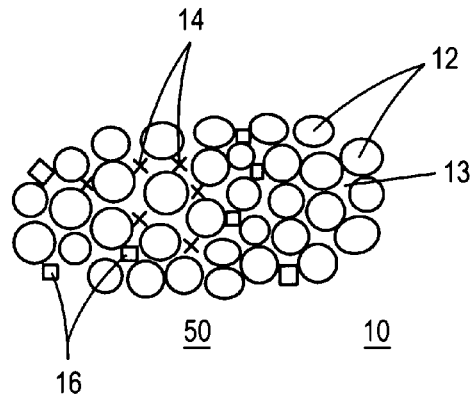
FIG. 1 is an illustration of a capsule cluster including a plurality of capsules, a binder, optionally a powdered component, and optionally a viscous substance.

As best seen in FIG. 1, an oral product 10 is provided. Preferably, the oral product 10 includes a matrix 50. In a preferred embodiment, the matrix 50 is formed by combining a plurality of functional and/or flavor capsules 12 and a binder 13.

In a preferred embodiment, the binder 13 is a food grade adhesive, gum or other binder. Suitable binders include, without limitation, sodium alginate, sugar, agar, guar gum, flour, water, maltodextrin and the like. In a preferred embodiment, the binder 13 is added in an effective amount such as about 10% to about 60% by weight of the oral product. If too much binder 13 is used the product is too viscous and will not adequately hold together. If too little binder 13 is used the oral product will be dry and may not hold together.

In a preferred embodiment, capsules 12 of various sizes are included in the oral product 10. Also preferably, about 2 to about 40 capsules 12 are included in the oral product 10, depending on the size of the final product and the size of the capsules. Preferably, the capsules 12 range in size from about 1 mm to about 8 mm depending on the ingredients contained therein. In an embodiment, the capsules 12 can have an average size of about 8 mm to about 14 mm or larger. In an embodiment, the capsules 12 form the majority of the oral product 10.

Preferably, the capsules 12 include functional and/or flavor ingredients so as to provide various textures and flavors to the user.

In a preferred embodiment, the capsules 12 include various functional ingredients such as, without limitation, chemesthesis agents, antioxidants, vitamins, soothing agents, energizing agents, alerting agents, calming agents, and the like. In a preferred embodiment, the soothing agents include, without limitation, theanine, chamomile, lavender, jasmine, and the like. Preferably, the energizing ingredients or vitamins include, without limitation, caffeine, taurine, guarana, vitamin B6, vitamin B12, and the like. Suitable chemesthesis ingredients provide, without limitation, hot, spicy, or cooling flavors such as mint, menthol, capsaicin, cinnamon, pepper, and the like.

In an embodiment, the capsules 12 can include an effervescent agent. Suitable effervescent agents include, without limitation, gases, baking soda and citric acid.

The capsules 12 and/or the porous pouch may include berry flavors such as, without limitation, pomegranate, acai, raspberry, blueberry, strawberry, and/or cranberry. Other suitable flavors include, without limitation, any natural or synthetic flavor or aroma, such as menthol, peppermint, spearmint, bourbon, scotch, whiskey, cognac, hydrangea, lavender, chocolate, licorice, citrus and other fruit flavors, such as apple, peach, pear, cherry, plum, orange and grapefruit, gamma octalactone, vanillin, ethyl vanillin, breath freshener flavors, spice flavors such as cinnamon, clove, nutmeg, sage, anise, and fennel, methyl salicylate, linalool, jasmine, coffee, bergamot oil, geranium oil, lemon oil, and ginger oil. Other flavorants include hot and spicy flavors and/or natural botanicals, such as guarana. The capsules 12 may also include botanical components including tea and tea extracts and/or herbs and herb extracts.

In an embodiment, the capsules 12 have shells of varying thicknesses. Varying the thicknesses of the shells of the capsules 12 included in the oral product 10 allows for the ingredients contained in each capsule 12 to be released at varying rates so as to prolong the flavor and/or functional experience. Preferably, the shells range in thickness from about 0.1 mm to about 7 mm (e.g., about 1 mm to about 4 mm or about 2 mm to about 5 mm), depending on the size of the capsule and the preferred dissolution rate. Preferably, the capsules having the thinnest shells dissolve first to release the enclosed flavors and functional ingredients. Capsules having thicker shells dissolve thereafter to provide continued flavor and functional ingredients.

In a preferred embodiment, the ingredients of the capsules 12 are released by mastication, sucking, moisture, pH change, and the like. Each of the capsules 12 included in the oral product 10 may have the same or a different release mechanism to aid in varying the release rate of the capsules 12.

In a preferred embodiment, the matrix 50 also includes a powdered component 14 to provide an additional layer of texture and/or flavor. Preferably, the powdered component 14 is added to the matrix in an amount of about 10% to about 40% by weight of the oral product (e.g., about 10% to about 20%, about 20% to about 30% or about 30% to about 40%). If too much of the powdered component 14 is used, the matrix 50 becomes too dry. If too little of the powdered component 14 is used, no additional texture is provided to the user. In an embodiment, the powdered component can include ground, chopped or shredded material. The powdered component 14 can be dispersed throughout the matrix 50 or placed in discrete locations within the matrix 50.

Preferably, the powdered component 14 is selected from, without limitation, dry sour cream, baking soda, powdered sugar, powdered cocoa, powdered spices, and/or powdered herbs and other botanicals such as tea and/or tea extracts or guarana. The powdered component 14 is mixed into the matrix 50 containing the capsules 12 and the binder 13 to provide an additional texture and flavor for the user.

In another embodiment, the matrix 50 also includes a viscous substance. In a preferred embodiment, the viscous substance 16 is selected from substances such as honey, molasses, syrups, and the like. Preferably, the viscous substance 16 is included in the matrix 50 in an effective amount such as about 20% to about 70% by weight of the oral product (e.g., about 20% to about 30%, about 30% to about 40%, about 40% to about 50%, about 50% to about 60% or about 60% to about 70%). The viscous component 16 can be dispersed throughout the matrix 50 or placed in discrete locations within the matrix 50.

If too much of the viscous substance 16 is used the matrix 50 is too gooey. Preferably, enough of the viscous substance 16 is used to provide an additional texture and/or flavor to the user.

Preferably, the viscous substance 16 has low water activity and therefore, may be partially dried. Preferably, the water activity of the viscous substance 16 is about 0.4 aw to about 0.8 aw. Most preferably, the water activity of the viscous substance 16 is about 0.56 aw. If too much water remains in the viscous substance 16, the matrix 50 will not hold together and cannot be molded or contained within a pouch prior to consumption. However, some water is desired to give the user another texture and flavor when ingesting the oral product 10.

In an embodiment, the viscous substance 16 acts as the binder to hold the capsules 12 together in the matrix 50. When used as the binder, the viscous substance 16 is added in an effective amount such as about 10% to about 60% by weight of the oral product.

In a preferred embodiment, the matrix 50 is molded into a shape that is sized and configured to fit comfortably in a user's mouth. The matrix 50 may be molded into a variety of shapes including, without limitation, pouch shape, circle, rhombus, trapezoid, ellipsis, oval, square, rectangle, heart, rod-shape, half-moon shape, crescent shape, teardrop, oblong shape, and the like. In an embodiment, the shape of the matrix 50 is indicative of the flavor. Thus, the matrix may be in the shape of fruits, vegetables, or other objects that can indicate a flavor. For instance, the matrix 50 could be in the shape of a pepper to indicate a hot and/or spicy flavor. In an embodiment, the shape of the matrix may be indicative of the contents or flavor. For example, a tea leaf shaped matrix can include teas and/or tea extracts.

Preferably, the matrix 50 is molded so that the dimensions of the shape are about 10 mm to about 25 mm in length, about 10 mm to about 25 mm in width, and about 10 mm to about 25 mm thick. Also preferably, the matrix 50 that forms the oral product 10 weighs about 0.2 g to about 5.0 g or about 0.5 g to about 5.0 g. Preferably, the matrix 50 has dimensions and a weight that allow the matrix 50 to fit comfortably and discreetly in a user's mouth.

Figure 2:
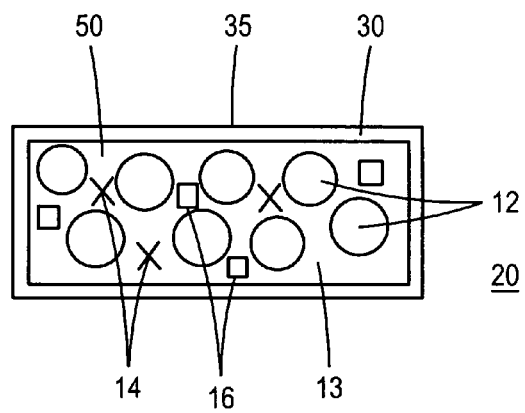
FIG. 2 illustrates a cross-sectional view of an oral product, including a binder, enclosed in a porous pouch.

In one embodiment, as seen in FIG. 2, an oral, pouched product 20 includes a porous material 35 that forms a pouch 30. In a preferred embodiment, the pouch 30 contains the matrix 50. Preferably, the matrix 50 contains a plurality of capsules 12, a binder 13, optionally a powdered component 14, and/or optionally a viscous component 16. In a preferred embodiment, the matrix 50 completely fills the interior of the pouch 30. In another embodiment, the matrix 50 partially fills the interior of the pouch 30.

Preferably, the pouch 30 is sized and configured to fit comfortably in a user's mouth. Preferably, the pouched oral product 30 provides a single serving of flavor and/or functional ingredients, and the pouch is discarded after use.

In an embodiment, the pouch 30 has dimensions of about 0.1 inches to about 2.0 inches. In an embodiment, the pouched oral product 30 weighs between about 0.5 g and 5.0 g. Oral products 30 that weigh more may not fit comfortably in the user's mouth.

Preferred pouch shapes include, without limitation, a half moon, sphere, rectangle, square, oval, pouch-shape, crescent, rod-shape, oblong, cylindrical, tea leaf, tear drop, or hourglass shapes. In an embodiment, the pouch-shape is similar to a ravioli or pillow shape. Other shapes may be utilized so long as the shapes are comfortable (do not have rough edges that are uncomfortable to the user) and fit discreetly in a user's mouth. In an embodiment, the shape of the pouch is indicative of the flavor. Thus, the pouch may be shaped as fruits, vegetables, or other objects. For instance, the pouch could be in the shape of a banana to indicate a banana flavor.

In a preferred embodiment, the pouched oral product 30 is made of a porous material 35. Preferably, the porous material 35 allows the flavors and functional ingredients contained in the matrix 50 to diffuse out of the pouch 30 and into the user's mouth.

The porous material 35 may be a fabric or paper such as those commonly used to construct tea bags. Alternatively, the porous material 35 may be an edible, dissolvable, or disintegrable material made from polymers commonly used in the food industry. In an embodiment, the porous material 35 is flavored. In another embodiment, the porous material 35 is neither dissolvable nor disintegrable, and must be removed from the user's mouth after the matrix 50 is consumed.

Figure 3:
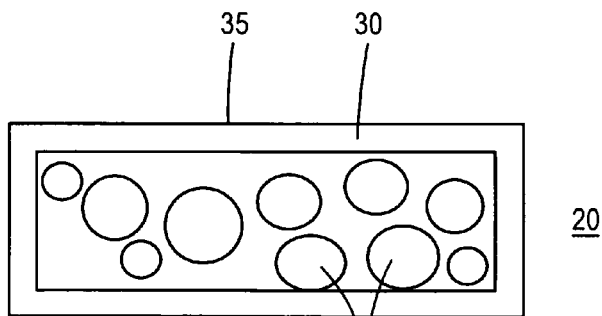
FIG. 3 illustrates a cross-sectional view of an oral product, excluding a binder, enclosed in a porous pouch.

In yet another embodiment, as seen in FIG. 3, a pouched oral product 20 is provided. The pouched oral product 20 includes a plurality of capsules 12 that provide flavor and/or functional ingredients. The capsules 12 are contained in a pouch 30 that is made of a porous material 35, as described above, so that the flavors and functional ingredients can diffuse into the user's mouth.

Figure 4:
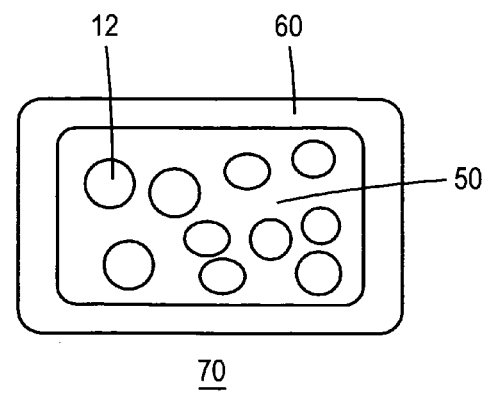
FIG. 4 illustrates a cross sectional view of one embodiment of an oral product with a super-hydrated, monolayer membrane coating.

In a preferred embodiment, the oral product is coated by a semi-dissolvable, super-hydrated membrane coating prepared from a multi-component polymer. In a preferred embodiment, as seen in FIG. 4, the matrix 50 is coated with a two polymer solution as disclosed in U.S. Utility patent application Ser. No. 11/984,041, the entire content of which is incorporated by reference.

FIG. 4 illustrates a cross-sectional view of one embodiment of a oral product 70 including a matrix 50 coated with a super-hydrated, monolayer membrane coating 60. The super-hydrated membrane coating 60 has a single layer, bicomponent coating that coats the matrix 50. The bicomponent coating 60 includes a soluble polymer and an insoluble polymer which may be the same or different polymer.

Preferably, the oral product 70 is sized and configured to fit comfortably between the user's cheek and gum. The oral product 70 may be formed in many shapes including, without limitation, spheres, rectangles, oblong shapes, circles, tear drops, squares, half moon shapes, and the like.

In a preferred embodiment, the coating encloses a pre-portioned matrix 50. Also, the coating allows the functional and/or flavor ingredients to leach out of the coating, while still remaining intact to hold the matrix 50 within the coating through the duration of use. The coating provides a soft compliant feel to the tongue and mouth tissues.

Once the soluble component of the super-hydrated membrane coating 60 dissolves or disintegrates, additional moisture and/or flavors are released into the user's mouth. Thereafter, the flavors and/or functional ingredients pass through the coating to provide an uninterrupted flavor experience to the user.

In a preferred embodiment, the super-hydrated membrane coating 60 may be provided with a desired rate of dissolution of the soluble component of the coating by altering the proportion of the soluble component to the insoluble component.

In another embodiment, the super-hydrated membrane coating 60 includes flavors, sweeteners, and/or a chemesthesis agent. The flavors, sweeteners and chemesthesis agents can be released upon dissolution of the soluble component of the super-hydrated membrane coating. If slow release of certain flavor additives is desired, such additives can be incorporated in the insoluble component. Preferably, the released flavors enhance the oral sensorial experience of the oral product user.

In a preferred embodiment, the super-hydrated membrane coating is not messy or sticky to the touch. Because two polymers are used to create the coating, when a user touches the coating, the polymers do not disassociate from one another. Therefore, the coating is not sticky when the product is removed from a package and placed in the mouth.

Preferably, the final oral product 70 weighs about 0.5 grams to about 5.0 grams. The weight is predominately based on the weight of the enclosed matrix 50 since the weight of the super-hydrated membrane coating 60 is minimal in comparison. In an embodiment, the shaped oral product 70 may be up to about 25 mm long, up to 25 mm in height, and up to 25 mm in width. Preferably, the oral product 70 is flexible, compressible, and capable of conforming to the shape of the oral cavity.

In an embodiment wherein the super-hydrated membrane coating 60 includes additives such as natural or artificial sweeteners, preferred sweeteners include, without limitation, water soluble sweeteners such as monosaccharides, disaccharides, and polysaccharides such as xylose, ribose, sucrose, maltose, fructose, glucose, and mannose. In an embodiment, sugar alcohols such as xylitol, sorbitol, mannitol and the like can be included. Also, non-nutritive sweeteners, such as sucralose, acesulfame K, neotame, aspartame and combinations thereof can also be included in the coating.

In an embodiment wherein additives such as chemesthesis agents may also be included in the super-hydrated membrane coating 60, preferred chemesthesis agents for inclusion in the super-hydrated membrane coating include, without limitation, capsaicin, tannins, mustard oil, wintergreen oil, cinnamon oil, allicin, quinine, citric acid, and salt.

In one embodiment, the super-hydrated membrane coating is created via ionic cross-linking. One or more polymers are used to create a single layer, thin membrane coating over the matrix 50.

In a preferred embodiment, a multi-component polymer coating containing at least two polymers is used so that the properties of the super-hydrated membrane coating, such as the rate of dissolution and the size and amount of pores in the coating, can be controlled.

The size of the pores, created when the soluble component dissolves, may be altered by patterning the coating in such a way as to ensure the soluble component is only in certain spots and in certain amounts so that once the soluble component dissolves away the pores are of a desired size.

In a preferred embodiment, the matrix 50 is molded in any shape to create a preform. Preferably, the matrix 50 is then dipped in a polymer solution containing two different polymers dissolved in water. Preferably, a chemically cross-linkable polymer and a non-cross-linkable polymer are used.

In a preferred embodiment, the concentration of the film forming polymer solution is about 0.5 wt % to 20 wt % polymer in the solution. Most preferably, the concentration of the film forming polymer solution is about 1 wt % to 1.5 wt % of the polymer components with the balance being water.

The concentration of the polymer solution determines the thickness of the coating membrane 60. The thickness of the coating can in turn affect how quickly the soluble component of the coating dissolves in a user's mouth. The coating 60 is a moist, gel-like coating when formed and the moistness is preferably retained until use. Preferably, the coated oral product 70 is hermetically sealed in suitable packaging to prevent moisture in the matrix 50 and coating 60 from evaporating.

If the coating 60 is peeled off of the oral product 70 and completely dried, the coating is preferably about 0.02 mm to 1.0 mm thick. More preferably, when the coating 60 is completely dried, it is about 0.08 mm to 0.14 mm thick. In a most preferred embodiment, the coating 60 when completely dried is about 0.11 mm thick. It should be noted that the coating 60 is not intended to be dried, but rather retains a high moisture content.

In a preferred embodiment, the weight of the coating 60 when completely dried is about 0.013 g for a coated oral product 70 weighing about 2.5 g. In contrast, the weight of the coating 60 for a coated oral product 70 weighing about 2.5 g, when the coating 60 is at the preferred moisture content is about 0.15 g.

After coating 60 the matrix 50 with the film forming polymer solution, cross-linking is conducted with a cross-linking solution including a monovalent metal ion salt or a bivalent metal ion salt.

Preferably, the cross-linking solution contains a bivalent metal ion salt. Most preferably, the cross-linking solution includes calcium lactate, which is commonly used in the food industry. In one embodiment, the cross-linking solution is a 2.0 wt % calcium lactate solution.

The oral product 70 is then exposed to air or patted dry to evaporate excess moisture to a water activity level of less than or equal to about 0.87 aw. The oral product 70 is not fully dried so that the moisture content remains high in the super-hydrated coating.

By using both a non-cross-linkable polymer and a cross-linkable polymer, the porosity and strength of the super-hydrated membrane coating can be controlled. For instance, the dissolution rate of the resulting super-hydrated membrane coating 60 can be altered by modifying the specific proportion of cross-linked to non-cross-linked polymers. In a preferred embodiment, the coating 60 contains about 10 wt % to about 90 wt % of the cross-linked polymer. Preferably, the proportion of cross-linked polymer in the coating 60 is about 60 wt % to about 70 wt %.

In another embodiment, the polymer solution and the cross-linking solution can be patterned, overprinted, or sprayed onto the matrix 50 preform to form a network having a soluble component and an insoluble component. The polymer solution may include a chemically, cross-linkable polymer and a non-cross-linkable polymer. Alternatively, the polymer solution may include a single chemically, cross-linkable polymer. When a single polymer is used, the cross-linking solution may be selectively sprayed to leave some portions of the coating non-cross-linked and soluble. The soluble component of the coating 60 may dissolve, leaving a porous network of insoluble component in place to maintain coherence of the matrix 50, while allowing the free flow of saliva in the user's mouth.

In an embodiment, the process may be automated. For instance, the coating step may occur via spraying the polymer solution and the cross-linking solution alternately onto a pre-formed portion of the matrix 50 to create a cross-linked, thin, super-hydrated membrane coating 60 of a desired thickness.

Fillers may be added to the coating 60 to make the coating opaque. Colorants may also be added to alter the color of the coating 60.

The following examples are exemplary and are not meant to limit any aspects of the embodiments disclosed herein.

Example 1

To form a super-hydrated membrane coating by ionic cross-linking of two biopolymers, a round bottom flask is charged with 1.0 g alginate, 0.5 g starch and 98.5 mL of deionized water. The mixture is stirred and heated to about 50° C. to 100° C. to dissolve the biopolymers The solution is cooled down to room temperature and then transferred to a plastic pan. 2.5 g of the matrix is first molded into a rectangular shape and then dipped into the above described solution. A cross-linking solution of 2.0 wt % calcium lactate in water is prepared. The coating on the matrix is then cross-linked with the 2.0 wt % cross-linking solution. The sample is exposed in air to evaporate moisture until the weight of the coated oral product reaches about 2.5 g to 2.8 g.

Example 2

To form a super-hydrated membrane coating by ionic cross-linking of two biopolymers, a round bottom flask is charged with 1.0 g alginate, 0.5 g gum arabic and 98.5 mL of deionized water. The mixture is stirred and heated to about 50° C. to 100° C. to dissolve the biopolymers. The solution is cooled down to room temperature and then transferred to a plastic pan. A cross-linking solution of 2.0 wt % calcium lactate in water is created. 2.5 g of the matrix is first molded into a rectangular shape and then dipped into the above described solution. The coating on the matrix is then cross-linked with the 2.0 wt % cross-linking solution. The sample is exposed in air to evaporate moisture until the weight of the coated oral product reaches about 2.5 g to 2.8 g.

Example 3

To form a super-hydrated membrane coating by ionic cross-linking of two biopolymers, a round bottom flask is charged with 1.0 g alginate, 0.5 g soy protein and 98.5 mL of deionized water. The mixture is stirred and heated to about 50° C. to 100° C. to dissolve the biopolymers. The solution is cooled down to room temperature and then transferred to a plastic pan. A cross-linking solution of 2.0 wt % calcium lactate is prepared. 2.5 g of the matrix is first molded into a rectangular shape and then dipped into the above described biopolymer solution. The coating on the matrix is then cross-linked with the 2.0 wt % cross-linking solution. The sample is exposed in air to evaporate moisture until the weight of the coated moist oral product reaches about 2.5 g to 2.8 g.

Also provided is a method of making an oral product. The method includes blending a plurality of capsules and a binder to form a matrix. In an embodiment a powder or a viscous substance may be blended with the capsules and binder to provide additional textures and flavors.

In one embodiment, the matrix is molded into a shape and size that fits comfortably in a user's mouth.

In another embodiment, a pouch is made from a porous material. The pouch can be formed of any shape and the seams can be formed by heat sealing. Preferably, the matrix is placed inside the pouch and the opening of the pouch is sealed so that the matrix is fully enclosed within the pouch.

While the foregoing has been described in detail with reference to specific embodiments thereof, it will be apparent to one skilled in the art that various changes and modifications may be made, and equivalents thereof employed, without departing from the scope of the claims.

We claim:
1. An oral product consisting of:
 a plurality of functional and/or flavor capsules, each capsule ranging in size from about 1 mm to about 8 mm or about 8 mm to about 14 mm and consisting of an outer shell and one or more functional and/or flavor ingredients selected from the group consisting of chemesthesis agents, antioxidants, vitamins, soothing agents, energizing agents, calming agents, effervescent agents, flavors and combinations thereof, the soothing agents selected from the group consisting of theanine, chamomile, lavender, jasmine and combinations thereof, the energizing agents selected from the group consisting of caffeine, taurine, guarana, vitamin B6, vitamin B12 and combinations thereof, the chemesthesis agents selected from the group consisting of mint, menthol, capsaicin, cinnamon, pepper, and combinations thereof and the flavors selected from the group consisting of menthol, peppermint, spearmint, bourbon, scotch, whiskey, cognac, hydrangea, lavender, chocolate, licorice, citrus, apple, peach, pear, cherry, plum, orange and grapefruit, gamma octalactone, vanillin, ethyl vanillin, cinnamon, clove, nutmeg, sage, anise, and fennel, methyl salicylate, linalool, jasmine, coffee, bergamot oil, geranium oil, lemon oil, ginger oil, tea herbs, and combinations thereof;

a binder in an amount sufficient to hold the plurality of functional and/or flavor capsules together in a molded shape;

a viscous component; and a powdered component in an amount of about 10% to about 40% by weight of the oral product, the powdered component being selected from the group consisting of dry sour cream, powdered spices, powdered herbs, powdered tea, herbs, powdered cocoa, and combinations thereof, wherein said plurality of capsules and said binder form a matrix that is molded and proportioned to create a single serving oral product that provides multiple textures and flavors when placed in a user's mouth and wherein the plurality of functional and/or flavor capsules forms the majority of the oral product, wherein the oral product is optionally coated with a coating, and wherein the oral product is optionally enclosed in a porous material that forms a pouch.

2. The oral product of claim 1, wherein said viscous component is included in the oral product in an amount of about 20% to about 70% by weight of the oral product, the viscous component being selected from the group consisting of honey, molasses, syrup, and combinations thereof.

3. The oral product of claim 1, wherein each of said functional and/or flavor capsules is activated to release the one or more functional and/or flavor ingredients by a mechanism selected from the group consisting of mastication, pH change, sucking, and combinations thereof.

4. The oral product of claim 1, wherein said oral product includes about 2 to 40 functional and/or flavor capsules.

5. The oral product of claim 1, wherein said oral product weighs about 0.5 g to about 5.0 g or about 0.2 g to about 0.5 g and has dimensions of less than about 25 mm.

6. The oral product of claim 1, wherein said coating is a super-hydrated membrane coating including a soluble, non-cross-linked component and an insoluble, cross-linked component and wherein said super-hydrated membrane coating is about 0.01 mm to about 3.0 mm thick when completely dried.

7. The oral product of claim 6, wherein said soluble, non-cross-linked component is formed by a non-cross-linkable polymer selected from the group consisting of starch, dextrin, gum arabic, guar gum, chitosan, cellulose, polyvinyl alcohol, polylactide, gelatin, soy protein, whey protein, and combinations thereof.

8. The oral product of claim 6, wherein said insoluble, cross-linked component is formed by cross-linking a cross-linkable polymer with a cross-linking agent, and wherein said cross-linkable polymer is a chemically cross-linkable polymer selected from the group consisting of alginate, pectin, carrageenan, modified polysaccharides with cross-linkable functional groups, and combinations thereof.

9. The oral product of claim 6, wherein the membrane comprises a single layer having an inner surface in contact with the matrix and an outer surface which is exposed to saliva and tissue in the oral cavity when placed therein.

10. The oral product of claim 1, wherein said pouch is dissolvable and/or disintegrable.

11. The oral product of claim 1, wherein said matrix is molded into a shape chosen from the group consisting of pouch, half-moon, crescent, oblong, rhombus, trapezoid, rectangle, square, oval, sphere, heart, rod-shape, and combinations thereof, and wherein said shape selected to correspond to a flavor contained therein and thereby indicates the flavor of the oral product to a consumer thereof.

12. The oral product of claim 1, wherein the binder is selected from the group consisting of sodium alginate, sugar, agar, guar gum, flour and water, maltodextrin, combinations thereof and the like.

13. The oral product of claim 1, wherein the outer shell of each of the plurality of functional and/or flavor capsules has a thickness ranging from about 0.1 mm to about 7 mm and wherein some of the plurality of functional and/or flavor capsules has different outer shell thicknesses so as to vary the dissolution rate of each of the functional and/or flavor capsules during use.

* * * * *